W. C. Griswold.
Stretching Hat Bodies.
Nº 84690        Patented Dec. 8, 1868
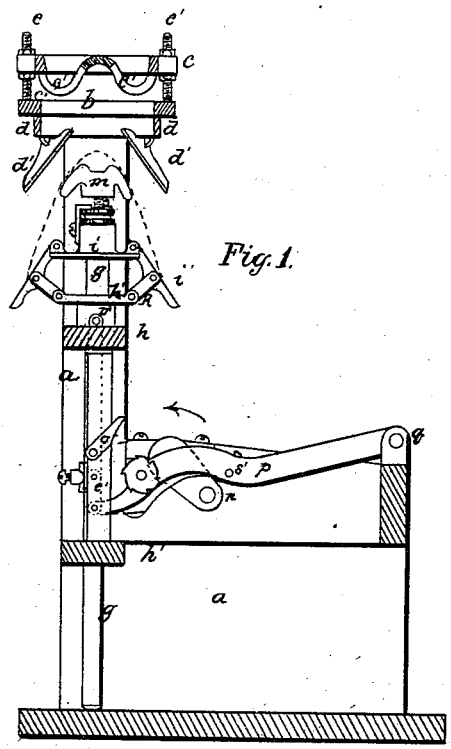
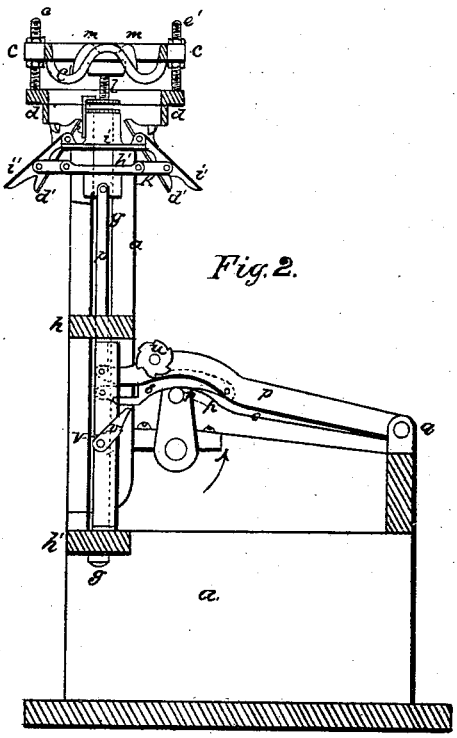
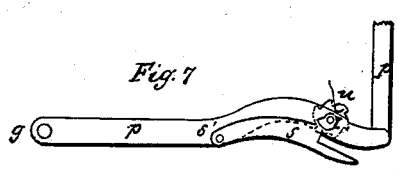
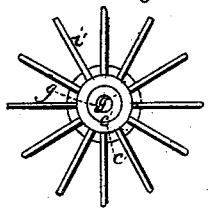
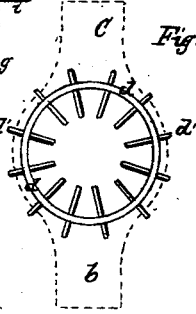
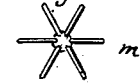
Witnesses                  Inventor
Albert H. Hook            Wm. C. Griswold

UNITED STATES PATENT OFFICE.

WILLIAM C. GRISWOLD, OF BROOKLYN, NEW YORK.

Letters Patent No. 84,690, dated December 8, 1868.

---

IMPROVEMENT IN MACHINES FOR STRETCHING HAT-BODIES.

---

The Schedule referred to in these Letters Patent and making part of the same.

---

*To all whom it may concern:*

Be it known that I, WILLIAM C. GRISWOLD, of the city of Brooklyn, in the county of Kings, and State of New York, have invented a new and useful Machine for Stretching the Tips and Brim-Parts of Hat-Bodies preparatory to their being blocked; and I do hereby declare the following to be a full, clear, and exact description of the same, reference being had to the annexed drawings, in which—

Figures 1 and 2 represent longitudinal vertical sections of the complete machine in two different positions.

Figure 3, plan view of ring $c$.

Figure 4, plan view of star $m$.

Figure 5, plan view of ring $d$, and in red lines the cross-bar to which this ring is secured.

Figure 6, plan view of plate $i$ and bars $i^1$.

Figure 7, a view of the rear side of lever.

Figure 8, vertical section of the upper end of rod $g$ and its appendages.

The machine consists of a frame constructed of two sides $a$, connected and held together by several horizontal cross-bars.

The upper cross-bar $b$ is made with a centre aperture, as shown in fig. 5, in red lines, representing a plan view of the said bar $b$.

To the lower side of this bar $b$, and concentric with its aperture, there is secured a ring, $d$, having a number of inclined radiating bars, $d'$, attached to it.

There is another ring, $c$, above the cross-bar $b$, capable of adjustment up and down, by means of stationary screw-studs $e$ and $e'$, and nuts $f$ and $f'$.

This ring $c$ contains in its interior six or more arms or spokes $c'$, which run in a curved shape towards the centre, as shown plainly in section, figs. 1 and 2. These two rings, $c$ and $d$, are concentric with each other.

On a vertical line with the centres of rings $c$ and $d$, and below them, there is a vertical rod, $g$, which is made to slide up and down in bearings in cross-bars $h$ and $h'$.

This rod $g$ carries on its upper end a horizontal circular plate, $i$, to which are jointed as many radiating arms $i^1$, as there are arms attached to ring $d$, and these arms $i$ are so arranged as to intervene with arms $d'$ when the rod $g$ is elevated, and they are made to be raised or expanded by links $k$, jointed to a plate or hub, $k'$, which is capable of sliding up and down on the centre rod $g$.

The upper end of this rod $g$ is made hollow, and into its bore there is inserted a vertical stud, $l$, having a screw-thread cut its whole length, and the upper end of this stud $l$ carries a star, $m$, the arms of which intervene with the spokes $c'$ when the rod $g$ is elevated, as shown in fig. 2.

This star is adjusted up and down on the centre rod $g$, by a nut, $n$, which is screwed on to the said stem or stud $l$, and which bears upon the upper end of the centre rod $g$.

The stem is kept down in place by a hook, $i^2$, attached to the plate $i$, and turning over the top side of nut $n$, or by any other convenient means.

The ring $c$, with its spokes, in connection with the star $m$, serves to stretch the tip of the hat; and the arms $d'$ of ring $d$, in connection with the movable arms $i^1$, perform the stretching of the brim.

The mechanism for giving the ascending motion to the rod $g$, and all its appendages, and for producing the spreading motion of the arms $i^1$, is as follows:

There are two levers, $o$ and $p$, both of the same shape, with their fulcra at $q$, and both operated by one crank-pin $r$, which receives a rotary motion, in the direction of the arrow, by any convenient means. The levers resting upon the said crank-pin $r$, by their weight, receive a reciprocating motion up and down. Lever $o$ imparts its motion, by means of a connecting-link, $o'$, to the vertical rod $g$ and all its appendages.

By the peculiar shape of the lever, it is enabled to stand still for nearly one-quarter of the revolution of the crank, and during this time the lever $p$, which is connected with the sliding hub $k'$ by a rod, $p'$, continues its upward motion, and so spreads the arms $i^1$.

It takes three or more strokes of the tip and brim-stretching mechanism to completely stretch the hat-body, and it is desirable that the stretching of the brim should be done gradually, that is to say, that the arms $i^1$ should not spread out to the full extent, except at the last stroke, and this I accomplish by attaching, to the side of the lever $p$, a smaller lever, $s$, having its fulcrum at $s'$. Said lever $s$ is depressed below the edge of lever $p$. Riding upon the crank-pin, it causes the lever $p$ to continue its upward motion, until both levers, $o$ and $p$, commence to descend.

The depression of lever $s$ is regulated by a small cam, $t$, against which the lever $s$ bears, and this cam is operated by a ratchet, $u$, and pawl $v$.

The operation of the machine is as follows:

When the machine is in a position as shown in fig. 1, the vertical rod $g$ and its appendages being at its lowest position, the hat-body can be placed over the star $m$ and the bars $i^1$, and now, the crank revolving the rod $g$, will ascend to a position, as shown in fig. 2, thereby corrugating the tip of the hat-body, and stretching the same, and while the rod $g$ remains in that elevated position, the lever $p$, by means of its side lever $s$, being depressed, continues its ascending motion, and therefore spreads the arms $i^1$, thereby corrugating the brim of the hat, between the arms $d'$ and $i^1$.

In this position the arms $i^1$ are shown in fig. 2. Now, the rod $g$ and its appendages descend rapidly, and when they have arrived at their lowest position, (shown in fig. 1,) the hat can be turned, by the operator, and the machine, continuing its motion, will raise the hat up again, and subject it to a second stretching, the stretching of the brim, this time, exceeding that of the first time, and so on, until the hat-body is thoroughly stretched.

I am aware that the tip-stretching and brim-stretching devices herein described are not in themselves new, and these I do not claim separately; but

What I claim as my invention, and desire to secure by Letters Patent, is—

The combination of the tip-stretching mechanism, consisting of the spokes $c'$ and star $m$, with the brim-stretching mechanism, consisting of the inclined stationary arms $d'$, and the expansible or spreading arms $i$, all constructed, arranged, and operating substantially as herein specified.

WM. C. GRISWOLD.

Witnesses:
A. KRIMMEL,
R. BOEKLEN.